(12) United States Patent
Corby et al.

(10) Patent No.: US 7,109,152 B1
(45) Date of Patent: Sep. 19, 2006

(54) LUBRICANT COMPOSITION

(75) Inventors: Michael Peter Corby, Annesley (GB); Jeffrey Denton, Annesley (GB)

(73) Assignee: JohnsonDiversey, Inc., Sturtevant, WI (US)

( * ) Notice: Subject to any disclaimer, the term of this patent is extended or adjusted under 35 U.S.C. 154(b) by 484 days.

(21) Appl. No.: 09/619,261

(22) Filed: Jul. 19, 2000

(30) Foreign Application Priority Data

Jul. 22, 1999 (EP) ............................ 99305796

(51) Int. Cl.
*C10M 173/00* (2006.01)
*C10M 107/50* (2006.01)

(52) U.S. Cl. .............. 508/183; 508/181; 508/208; 508/491; 508/583

(58) Field of Classification Search .............. 508/181, 508/183, 208, 583
See application file for complete search history.

(56) References Cited

U.S. PATENT DOCUMENTS

| | | |
|---|---|---|
| 2,670,069 A | 2/1954 | Dobkin ................ 184/17 |
| 3,011,975 A | 12/1961 | Nitzsche et al. |
| 3,213,024 A | 10/1965 | Blake et al. |
| 3,346,558 A | 10/1967 | Roth ................... 536/186 |
| 3,640,998 A | 2/1972 | Mansfield et al. ......... 536/183 |
| 3,664,956 A | 5/1972 | Messina et al. |
| 3,811,921 A | 5/1974 | Crawford et al. |
| 3,853,607 A | 12/1974 | Jyengar et al. |
| 3,876,410 A | 4/1975 | Scholes |
| 3,981,812 A | 9/1976 | Zietz |
| 4,053,076 A | 10/1977 | Vogel et al. |
| 4,062,785 A | 12/1977 | Nibert |
| 4,069,933 A | 1/1978 | Newing |
| 4,143,181 A | 3/1979 | Cahn et al. |
| 4,149,624 A | 4/1979 | Douty et al. ........... 198/500 |
| 4,162,347 A | 7/1979 | Montgomery |
| 4,223,129 A | 9/1980 | Roth et al. ............ 536/4 |
| 4,227,980 A | 10/1980 | Pregitzer et al. |
| 4,248,724 A | 2/1981 | MacIntosh |
| 4,252,528 A | 2/1981 | Decker et al. |
| 4,262,776 A | 4/1981 | Wilson et al. |
| 4,289,671 A | 9/1981 | Hernandez |
| 4,324,671 A | 4/1982 | Christian et al. |
| 4,343,616 A | 8/1982 | Decker et al. |
| 4,420,578 A | 12/1983 | Hagens et al. |
| 4,436,200 A | 3/1984 | Hodlewsk et al. |
| 4,478,889 A | 10/1984 | Maruhashi et al. |
| 4,486,378 A | 12/1984 | Hirata et al. |
| 4,506,763 A | 3/1985 | Frost et al. |
| 4,515,836 A | 5/1985 | Cobbs, Jr. et al. |
| 4,525,377 A | 6/1985 | Nickel et al. |
| 4,529,131 A | 7/1985 | Rutz |
| 4,534,995 A | 8/1985 | Pocock et al. |

(Continued)

FOREIGN PATENT DOCUMENTS

| | | |
|---|---|---|
| CA | 1157456 A | 11/1983 |
| DE | 196 42 598 | 4/1998 |
| EP | 0 359 330 | 3/1990 |
| EP | 0 372 628 | 6/1990 |
| EP | 0 844 299 | 5/1998 |
| EP | 0 767 825 | 9/1998 |
| GB | 1056042 | 1/1967 |
| GB | 1564128 | 4/1980 |
| JP | 57003892 | 1/1982 |
| JP | 06-136377 | 5/1994 |
| JP | 10053679 A | 8/1996 |
| NL | 9300742 | 12/1994 |
| WO | 94/19438 | 9/1994 |
| WO | 95/19412 | 7/1995 |
| WO | 95/26389 | 10/1995 |
| WO | 96/08601 | 3/1996 |
| WO | 98/56881 | 12/1998 |

OTHER PUBLICATIONS

The Alternative To Soap And Water For Lubricating Conveyor Lines, Jan. 1998, Food and Drink Business, pp. 35–36.
Lubrication And Lubricants Encyclopedia of Chemical Technology, vol. 15, pp. 463–517.
A Fracture Mechanics Approach To Environmental Stress Cracking In Poly(ethyleneterephthalate), Polymer, vol. 39, No. 3, pp. 75–80 (1998).
Material Safety Data Sheet for Lubostar CP (May 3, 2000).
Environmental Stress Cracking in PET Carbonated Soft Drink Containers, Eric J. Moskala, Ph.D., Eastman Chemical Company, presented at Bev Tech 98 (Savannah, GA).
Environmental Stress Cracking Resistance Of Blow Molded Poly(ethylene Terephthalate) Containers, Polymer Engineering And Science, vol. 32, No. 6, pp. 393–399 (Mar. 1992).
Copies of documents from litigation—*See attached detailed listing of documents enclosed.*
Copy of Civil Docket for case #:0.03–cv–02231–JNE–SRN, U.S. District Court, District of Minnesota (DMN), 14 pages.
European Search Report dated May 24, 2000 for PCT/EP00/05684.
International Search Report dated Sep. 28, 2000 for PCT/EP00/05684.
JP 10059523—Patent Abstracts of Japan dated Mar. 3, 1998.

*Primary Examiner*—Ellen M. McAvoy
(74) *Attorney, Agent, or Firm*—James J. Sales; Neil E. Hamilton; Renee J. Rymarz

(57) ABSTRACT

Use of a liquid composition for lubricating conveyor belts is provided, said liquid composition being suitable for producing a "dry" lubricant film on a surface by discontinuous application thereof, wherein the liquid composition can also be used for continuous application to a conveyor belt surface, with or without further dilution with water, to remove incidental spillages of extraneous material from the conveyor belt surface without loss of the required lubricity.

This liquid composition was found to exhibit remarkably good durability.

14 Claims, No Drawings

U.S. PATENT DOCUMENTS

| | | | |
|---|---|---|---|
| 4,538,542 A | | 9/1985 | Kennon et al. |
| 4,543,909 A | | 10/1985 | Sharpless |
| 4,569,869 A | | 2/1986 | Kushida et al. |
| 4,573,429 A | | 3/1986 | Cobbs, Jr. et al. |
| 4,604,220 A | * | 8/1986 | Stanton ................ 252/33.4 |
| 4,627,457 A | | 12/1986 | Bird et al. |
| 4,632,053 A | | 12/1986 | Villanueva et al. |
| 4,648,486 A | | 3/1987 | Kayser et al. |
| 4,652,386 A | | 3/1987 | Alberts et al. |
| 4,690,299 A | | 9/1987 | Cannon |
| 4,713,266 A | | 12/1987 | Hasegawa et al. |
| 4,714,580 A | | 12/1987 | Maruhashi et al. |
| 4,719,022 A | | 1/1988 | Hyde |
| 4,769,162 A | * | 9/1988 | Remus ..................... 252/18 |
| 4,828,727 A | | 5/1989 | McAninch |
| 4,851,287 A | | 7/1989 | Hartsing, Jr. |
| 4,874,647 A | | 10/1989 | Yatsu et al. |
| 4,897,203 A | | 1/1990 | King |
| 4,919,984 A | | 4/1990 | Maruhashi et al. |
| 4,929,375 A | * | 5/1990 | Rossio et al. ............. 252/49.3 |
| 4,944,889 A | | 7/1990 | Awad |
| 4,980,211 A | | 12/1990 | Kushida et al. |
| 5,001,935 A | | 3/1991 | Tekkanat et al. |
| 5,009,801 A | | 4/1991 | Wider et al. |
| 5,030,323 A | | 7/1991 | Awad |
| 5,043,380 A | | 8/1991 | Cole |
| 5,062,979 A | | 11/1991 | Scharf et al. |
| 5,064,500 A | | 11/1991 | Awad |
| 5,073,280 A | | 12/1991 | Rossio et al. ............. 508/410 |
| 5,080,814 A | | 1/1992 | Awad |
| 5,115,047 A | | 5/1992 | Hashimoto et al. |
| 5,139,834 A | | 8/1992 | Cole |
| 5,160,646 A | | 11/1992 | Scheld |
| 5,174,914 A | * | 12/1992 | Gutzmann ................ 252/34 |
| 5,182,035 A | | 1/1993 | Schmidt et al. |
| 5,191,779 A | | 3/1993 | Imauu et al. |
| 5,202,037 A | | 4/1993 | Lavelle et al. |
| 5,238,718 A | | 8/1993 | Yano et al. |
| 5,320,132 A | | 6/1994 | Weisse |
| 5,334,322 A | | 8/1994 | Williams, Jr. |
| RE34,742 E | | 9/1994 | Maier et al. |
| 5,352,376 A | | 10/1994 | Gutzmann |
| 5,371,112 A | | 12/1994 | Sayre et al. |
| 5,389,199 A | | 2/1995 | Awad et al. |
| 5,391,308 A | | 2/1995 | Despo |
| 5,474,692 A | | 12/1995 | Laufenberg et al. |
| 5,486,316 A | | 1/1996 | Bershas et al. |
| 5,509,965 A | | 4/1996 | Harry et al. |
| 5,510,045 A | | 4/1996 | Remus |
| 5,518,745 A | | 5/1996 | Thota et al. |
| 5,534,172 A | * | 7/1996 | Perry et al. .................. 508/156 |
| 5,538,654 A | | 7/1996 | Lawate et al. |
| 5,549,836 A | | 8/1996 | Moses ........................ 508/183 |
| 5,559,087 A | * | 9/1996 | Halsrud et al. ............. 508/579 |
| 5,565,127 A | | 10/1996 | Laufenberg et al. |
| 5,573,819 A | | 11/1996 | Nugent, Jr. et al. |
| 5,598,316 A | | 1/1997 | Kasting, Jr. |
| 5,633,131 A | | 5/1997 | Heym et al. |
| 5,652,034 A | | 7/1997 | Seiner |
| 5,658,619 A | | 8/1997 | Kirschner et al. |
| 5,663,131 A | | 9/1997 | Winicov et al. |
| 5,672,401 A | | 9/1997 | Anglin et al. |
| 5,681,628 A | | 10/1997 | Niederst et al. |
| 5,688,747 A | | 11/1997 | Khan et al. |
| 5,698,269 A | | 12/1997 | Carlblom et al. |
| 5,698,498 A | | 12/1997 | Luciani et al. |
| 5,721,023 A | | 2/1998 | Ostapchenko |
| 5,723,418 A | * | 3/1998 | Person Hei et al. ........ 508/511 |
| 5,728,770 A | | 3/1998 | Yamamoto et al. |
| 5,747,430 A | | 5/1998 | Matsushita et al. |
| 5,747,431 A | | 5/1998 | Taylour et al. |
| 5,779,027 A | * | 7/1998 | Ensch et al. ................ 198/841 |
| 5,783,303 A | | 7/1998 | Tsuei |
| 5,789,459 A | | 8/1998 | Inagaki et al. |
| 5,863,874 A | | 1/1999 | Person Hei et al. |
| 5,869,436 A | | 2/1999 | Lindman |
| 5,876,812 A | | 3/1999 | Frisk et al. |
| 5,925,601 A | * | 7/1999 | McSherry et al. .......... 508/425 |
| 5,935,914 A | | 8/1999 | Theyssen et al. ........... 508/517 |
| 5,985,346 A | | 11/1999 | Ayash |
| 6,060,444 A | | 5/2000 | Schulz et al. |
| 6,086,351 A | | 7/2000 | Thota et al. |
| 6,087,308 A | | 7/2000 | Butler et al. |
| 6,102,161 A | | 8/2000 | Gomez Diaz et al. |
| 6,103,308 A | | 8/2000 | Floyd et al. |
| 6,129,202 A | | 10/2000 | Layne et al. |
| 6,207,622 B1 | * | 3/2001 | Li et al. ...................... 508/208 |
| 6,214,777 B1 | * | 4/2001 | Li et al. ...................... 508/388 |
| 6,250,458 B1 | * | 6/2001 | Shibayama et al. ......... 198/851 |
| 6,288,012 B1 | | 9/2001 | Li et al. |
| 6,427,826 B1 | | 8/2002 | Li et al. |
| 6,485,794 B1 | | 11/2002 | Li et al. |
| 6,495,494 B1 | * | 12/2002 | Li et al. ...................... 508/206 |

* cited by examiner

LUBRICANT COMPOSITION

FIELD OF THE INVENTION

The present invention relates to lubricant solutions suitable for producing a lubricant film. More particularly, the invention relates to such lubricant solutions and their use as a lubricant for the lubrication of conveyor belts. These conveyor belts are generally used for the transport of glass, plastic or cardboard containers, particularly plastic containers of polyethylene terephthalate (PET) or polycarbonate, and metal cans.

BACKGROUND OF THE INVENTION

Known conveyor belt lubricants are employed in applications in which good gliding contact between solid surfaces, for instance glass and metal, or plastic and metal must be ensured.

These applications include bottle filling and conveying plants, where the lubricants are applied to the conveyor belts to ensure the trouble-free conveyance of bottles on the belt. In many known systems, a soap such as potash-based soft soap is used as the lubricant.

As a substitute for the soap-based lubricants, a variety of synthetic conveyor belt lubricants including certain amine compounds are being used. These synthetic lubricants have been described in, for example, EP-A-372,628, U.S. Pat. No. 5,073,280 and EP-A-767,825.

These conveyor belt lubricants are generally supplied as concentrates and use concentrations of such concentrates are usually prepared by applying typical dilution rates of 0.2–1.0% by weight concentrate in water depending on the friction requirement and the water type.

Such aqueous belt lubricants having a use concentration of the active lubricating ingredients of significantly less than 1% by weight have been satisfactorily applied for many years.

On the other hand, the application of these aqueous lubricants has also resulted in high water usage rates and relatively high effluent costs for the user.

Furthermore, when used as conventionally intended these aqueous lubricants flow off the conveyor track surface treated therewith, resulting in a waste of chemical and water, and causing a slippery floor surface which may constitute a hazard to operators working in the immediate environment.

Lubrication in a wide range of lubricating applications involving moving metal parts including metal shaping operations, such as drilling, cutting and drawing, by means of the deposition of a lubricant film has been known for many years. For instance, U.S. Pat. No. 5,549,836 discloses a mineral oil-free aqueous lubricant composition useful for producing a lubricant film and suitable for use in the above-mentioned types of lubricating applications involving moving metal parts.

We have now surprisingly found that certain specific liquid formulations suitable for producing a "dry" lubricant film, can be advantageously used as a conveyor belt lubricant, whereby the above-described problems observed when using the aqueous conveyor belt lubricants of the prior art are effectively overcome.

In particular, we have found that such liquid formulations have both good lubricating properties and adequate cleaning characteristics.

In this connection, a "dry" lubricant film is defined as a lubricant film which remains on the surface onto which it is applied as a liquid, and which, consequently does not flow off, or is easily removable from, said surface.

DEFINITION OF THE INVENTION

Accordingly, the present invention provides the use of a liquid composition suitable for producing a "dry" lubricant film on a surface by discontinuous application of said composition, for lubricating conveyor belts, said liquid composition comprising up to 95% by weight of an aqueous phase and also being suitable for continuous application to a conveyor belt surface, with or without further dilution with water, to remove incidental spillages of extraneous material from the conveyor belt surface without loss of the required lubricity.

The required lubricity is defined to be the lubricity which ensures trouble-free operation of the conveyor belt concerned.

In another aspect, the present invention provides a method of lubricating a conveyor belt, comprising the steps of
  (i) formulating a liquid composition suitable for producing a "dry" lubricant film on a surface by discontinuous application of said composition, said composition comprising up to 95% by weight of an aquous phase and also being suitable for continuous application to a conveyor belt surface, with or without further dilution with water, to remove incidental spillages of extraneous material from the conveyor belt surface without loss of the required lubricity, and
  (ii) applying said liquid composition to the conveyor belt as a thin "dry" lubricant film.

DETAILED DESCRIPTION OF THE INVENTION

The liquid composition of the present invention was found to be very suitable for lubricating conveyor belts. For establishing a "dry" lubricant film on the conveyor belt, only a minor amount of said liquid composition is needed. Typically an amount of 2–20 ml of the liquid composition is sufficient when applied every 20 minutes and fed to a normal size single conveyor belt. Said liquid composition is applied to the conveyor belt in undiluted form, either manually or by means of an automatic applicator.

In contrast to the aqueous conveyor belt lubricants of the prior art, the liquid composition of the present invention does not need to be fed continuously to the conveyor belt treated therewith.

In this connection, the friction coefficient ($\mu$) being a measure for the friction between the containers (e.g. bottles, carton boxes, metal cans) transported by the conveyor belt and the belt surface; is of importance. It has been observed that the friction coefficient obtained after ceasing the application of the liquid material of the invention to the surface of the belt, is sufficiently low for a much longer time period than when using the aqueous conveyor belt lubricants of the prior art.

In other words, the durability—being a measure of the time period during which the liquid of the invention adequately lubricates the conveyor belt after cessation of the application thereof to said belt—is much better for the liquid composition of the invention.

When spillages of the contents of the containers transported by the treated conveyor belt would occur, said conveyor belt can be adequately cleaned by taking one or more of the following actions:
  raising the feed rate of the liquid of the invention;
  adding water to said liquid.

The liquid composition

The liquid composition of the invention may be effectively water-based. In that case, it comprises an aqueous phase which suitably constitutes about 10–95% by weight, preferably 50–90% by weight, of the overall composition. Alternatively, the liquid of the invention may be substantially non-aqueous, and comprise less than 10% by weight of water.

If said liquid is water-based, it preferably contains from 1–15% by weight of a volatile water-miscible solvent such as methanol, ethanol and isopropanol, as an aid in assisting the evaporation of the water from the lubricant film deposited on the conveyor belt when using the liquid. When present, the solvent forms part of the aqueous phase.

If the liquid of the invention is water-based, it may be desirable to incorporate an effective amount of an anti-rust additive.

In order to obtain adequate disinfection in case of spillages, it may also be desirable to incorporate a biocide.

Silicone oil

The liquid composition of the invention may desirably comprise a silicone oil and an aqueous phase. This type of liquid composition is effectively a silicone emulsion in water.

Favourable results in terms of durability were obtained when this liquid composition was applied on conveyor belts used for transporting containers selected from polyethylene terephthalate bottles, polycarbonate bottles, laminated cardboard containers and metal cans made from steel and aluminium. Furthermore, for obtaining most favourable results with this type of liquid, said conveyor belts are preferably made of plastic, polyacetal or polyamide.

This liquid composition of the invention preferably comprises:

10–95% by weight of the aqueous phase; and
1–55% by weight of the silicone oil.

More preferably, the concentration of the silicone oil in this liquid composition is 10–40% by weight.

Suitable silicone oils are polydimethyl siloxane fluids having viscosities of from 1000 to 30.000 centistokes. The silicone oil which is homogeneously dispersed in the aqueous phase, is particularly suitable for assisting penetration of the liquid composition of the invention into difficult to reach areas when applied to the conveyor belt.

Vegetable oil/mineral oil

Alternatively, the liquid composition of the invention may desirably comprise an oil selected from vegetable oils, mineral oils and mixtures thereof, and, optionally, water. This type of liquid composition preferably comprises: 10–90% by weight of the oil, and 10–50% by weight of water. This preferred type of liquid which is effectively an emulsion of the water in the oil, was found to be very suitable for lubricating conveyor belts used for transporting any type of containers. Best results were obtained when said belts were used for transporting containers selected from glass bottles, steel and aluminium cans, cardboard containers, plastic bottles and plastic crates. Said conveyor belts may be made of any type of material.

Desirably, the oil is homogeneously dispersed in the aqueous phase.

Most preferred for use in the liquid of the invention are vegetable oils such as rapeseed oil, soya oil, palm oil, olive oil, sunflower oil and mixtures thereof. Synthetic oils such as glyceryl trioleate are also preferred as a constituent of said liquid.

Vegetable oils are particularly desirable in view of their environmental acceptability.

Polyhydric alcohol

Particularly when intended for use on conveyor belts made of plastic material such as those made of polyacetal and polyamide, the liquid of the invention may suitably comprise a polyhydric alcohol. This type of liquid was found to show good lubricating performance when applied on this type of belt which may be used for transporting any type of container. However, this liquid may also be used on steel tracks with certain types of containers.

This liquid of the invention may be either substantially non-aqueous or contain 10–80% by weight of water.

It preferably contains the polyhydric alcohol in an amount of at least 20% by weight.

Suitable polyhydric alcohol are glycerine (i.e. propane 1,2,3-triol), propylene glycol and ethylene glycol.

PTFE

In various embodiments of the invention in which the liquid composition includes an aqueous phase, it is particularly preferred that said liquid composition includes polytetrafluoroethylene (PTFE) resin, in the form of an ultrafine particle dispersion of the resin incorporated in the aqueous phase.

Particularly, when said liquid composition comprises a vegetable and/or mineral oil, or a polyhydric alcohol (see above), it is preferred to aid said PTFE resin to this liquid composition. In such cases, the PTFE considerably improves the lubricity and wear properties of the "dry" lubricant film produced by the liquid of the invention, when in use.

Preferably, the PTFE will constitute 2–25% by weight, more preferably 2–10% by weight, of the liquid composition.

Surfactant

A wide variety of surfactants selected from anionic, nonionic, cationic and amphoteric surfactants, may be effectively used in the lubricant composition of the present invention.

It is believed that these surfactants improve the stability of the liquid of the invention particularly when it contains an aqueous phase. These surfactants may also improve the chemical compatibility of the liquid of the invention with the construction material of certain containers transported by the belts treated with said liquid. In particular, it was found that anionic surfactants may improve the PET compatibility of a liquid composition containing a polyhydric alcohol such as glycerine.

The concentration of the surfactant material in the liquid of the invention is preferably in the range of 0.1–10% by weight, more preferably 0.2–6% by weight.

Further information on this surfactant material can be found in "Surface Active Agents", Vol.I, by Schwartz & Perry, Interscience 1949, and "Surface Active Agents", Vol. II, by Schwartz, Perry & Berch (Interscience 1959).

A particularly suitable type of surfactant material is nonionic surfactant. Nonionic surfactants are well-known in the art. They normally consist of a water-solubilising polyalkoxylene or a mono- or di-alkanolamide group in chemical combination with an organic hydrophobic group derived, for example, from alkylphenols in which the alkyl group contains from about 6 to about 12 carbon atoms, dialkyl phenols in which each alkyl group contains from 6 to 12 carbon atoms, primary, secondary and tertiary aliphatic alcohols (or alkyl-capped derivatives thereof), preferably having from 8 to 20 carbon atoms, monocarboxylic acids having from 10 to 24 carbon atoms in the alkyl group and polyoxy propylenes. Also common are fatty acid mono- and dialkanolamides in which the alkyl group of the fatty acid radical contains from 10 to about 20 carbon atoms and the alkoxyl group having from 1 to 3 carbon atoms. In any of the mono- and di-alkanolamide derivatives, optionally there may be a polyoxyalkylene moiety joining the latter groups and the hydrophobic part of the molecule.

In all polyalkoxylene containing surfactants, the polyalkoxylene moiety preferably consists of from 2 to 20 groups of ethylene oxide or ethylene oxide and propylene oxide. Among the latter class, particularly preferred are those ethoxylated nonionics which are the condensation products of fatty alcohols with from 9 to 15 carbon atoms condensed with from 3 to 11 moles of ethylene oxide. Examples of these are the condensation products of C11–C13 alcohols with (say) 3 to 7 moles of ethylene oxide. Another class of suitable nonionics include the alkyl polysaccharides (polyglycosides/oligosaccharides), such as described in U.S. Pat. Nos. 3,640,998; 3,346,558 and 4,223,129.

Examples of anionic surfactants suitable to be included in the lubricant composition of the present invention, are alkali metal, alkaline earth metal, or ammonium salts of alkylbenzene sulphonates having from 10 to 18 carbon atoms in the alkyl group, alkyl and alkylether sulphates having from 10 to 24 carbon atoms in the alkyl group, the alkylether sulphates having from 1 to 5 ethylene oxide groups, and olefin sulphonates prepared by sulphonation of C10–C24 alpha-olefins and subsequent neutralisation and hydrolysis of the sulphonation reaction product.

Use

Dispensing equipment developed for dosing the liquid composition of the invention has been designed to apply the liquid directly to the surface of the conveyor belt. Since relatively expensive neat product is applied, this equipment has been developed such that any spillage of liquid material (e.g. by flowing under gravity away from the treated surface or dripping down onto the floor)) is avoided so as to minimise wastage of said liquid.

Various types of applicator have been developed for feeding the liquid composition onto the conveyor belt treated therewith.

If the liquid is a stable low viscosity material—such as an aqueous silicone oil containing product—then it can be accurately dosed by a metered diaphragm pump.

Such stable low-viscous liquids of the invention can be adequately dispensed using a brush applicator, including a brush that has internal channels through which liquid solution can be pumped into the bristles thereof. When in use, the motion of the conveyor belt spreads the lubricant over the surface thereof. This dispensing method was found to be accurate and effective, especially when used for dosing low viscous material onto single conveyor belts.

Particularly if the liquid of the invention contains PTFE, it is a viscous product which usually requires some degree of agitation to help and keep the PTFE particles in suspension. As a consequence, rather special measures are needed to be taken in order to adequately dispense said liquid at the point of use.

So as to achieve good dispensing performance if the liquid of the invention is viscous, it was found that so-called "flicker" non-contact applicators can be suitably used. These applicators are also suitable for use on multiple conveyor belts.

The "flicker" unit contains a motor-driven rotating tubular brush, which picks up liquid from a sump via transfer rollers. A steel plate mounted against the brush flicks the bristles as the brush rotates, to generate a mist of droplets of liquid material directed on to the surface of the conveyor belt so as to coat the belt.

As a result, an even coverage of the conveyor belt is obtained, which is not affected by variation of the lubricant viscosity.

In contrast to conventional dilute lubricants of the prior art, the lubricant of the invention is usually dosed sparingly with long intervals between doses.

For instance, the "flicker" applicator described above dispenses about 0.1 grams of lubricant per second.

Running this unit for 5 seconds every 10 minutes was found to be sufficient to keep a 640 bottles per minute conveyor belt line in operation without any problems.

When using brush applicators, a higher volume of lubricant is generally needed than with "flicker" units, so as to ensure smooth operation of the conveyor belt. On the other hand, since the brush also acts as a reservoir of the liquid, longer dosing intervals are possible between dosings of liquid product to the brush applicator.

Optional ingredients

Further optional ingredients of the lubricant composition of the present invention include water softeners such as ethylenediamine tetraacetic acid (EDTA) and nitrilotriacetic acid (NTA), dyes, odorants, such as lemon oil and the like, antifreeze additives to improve storability under freezing conditions, preservatives such as formaldehyde to inhibit mould growth, and buffers to optimize the pH to a value in the range of 3–10, preferably 4–9.

The present invention will now be further illustrated by the following non-limiting examples.

EXAMPLE 1,2, 3, A AND B

Three liquid compositions according to the invention having the following compositions were prepared by thoroughly mixing its ingredients:

|  | % by weight |
|---|---|
| Example 1 | |
| water | 84.2 |
| Dow Corning 346 | 15.0 |
| Acetic acid (80%) | 0.6 |
| Formaldehyde solution (40%) | 0.2 |
| Example 2 | |
| Sunflower oil | 55.0 |
| Water | 40.0 |
| PTFE-powder | 4.8 |
| Alkylamine | 0.2 |
| Example 3 | |
| Glycerine | 88.0 |
| Dowfax 3B2 | 2.0 |
| PTFE-dispersion TE 3667N | 10.0 | wherein:
  Dow Corning 346—Silicone oil emulsion
  Dowfax 3B2—anionic surfactant
  PTFE-dispersion TE 3667N—60% PTFE in 40% liquid, ex Univar Dupont.

The performance, particularly the durability, of these liquids were tested by applying them on to a single conveyor belt, using a brush applicator for the liquid of example 1 respectively a "flicker" applicator for the other two liquids.

The conveyor belt used in the test was made of polyacetal material and transported PET bottles. The liquids were fed to the conveyor belt, in an amount of 10 ml.

In order to test the durability of the tested liquids of the invention, several measurements of the friction coefficient (μ) were performed using a strain gauge meter. (Correx-type) These measurements were carried out at the time of applying the liquids, and subsequently 10 minutes later, 20 minutes later and 30 minutes later.

The measurements of μ were carried out by holding a bottle stationary against the motion of the conveyor belt using the strain gauge meter. The friction coefficient (μ) is defined as the force by the containers held against the movement of the conveyor belt divided by the weight of the containers.

For reasons of comparison, the durability of two aqueous lubricants of the prior art was also tested, using the same conveyor belt configuration.

The composition of these known aqueous lubricants is shown below:

|  | (% wt) |
|---|---|
| Example A | |
| Water | 85.5 |
| Carboxylated alkyl ethoxylate | 5.0 |
| Alkyl ethoxylate | 3.0 |
| Acetic acid glacial | 1.5 |
| Alkyl diamine | 5.0 |
| Example B | |
| Water | 67.8 |
| Potassium hydroxide (50%) | 6.9 |
| EDTA acid | 1.3 |
| Fatty acid | 14.0 |
| Alkane sulphonate | 7.0 |
| Preservative | 3.0 |

These known aqueous lubricants were diluted with water to obtain 0.5% wt use solutions thereof, and these use solutions were applied to the conveyor belt in an amount of 100 ml.

The results of the durability tests for both the above three liquids of the invention (Examples 1, 2 and 3) and the aqueous lubricants of the prior art (Examples A and B) are shown in the following table:

| Friction coefficient (μ) (on polyacetal belt transporting PET-bottles) | | | | |
|---|---|---|---|---|
| Time (min.) after applying liquid/lubr. | 0 | 10 | 20 | 30 |
| Example 1 | 0.10 | 0.115 | 0.115 | 0.115 |
| Example 2 | 0.07 | 0.075 | 0.084 | 0.085 |
| Example 3 | 0.07 | 0.07 | 0.07 | 0.08 |
| Example A | 0.14 | after 5 minutes = >0.2 | | |
| Example B | 0.13 | 0.13 | after 11 minutes = >0.2 | |

It can be seen that the friction coefficients obtained with the liquid compositions of the invention remain below 0.12 during 30 minutes, which is quite adequate for good operation of the conveyor belt. On the other hand, when applying the aqueous lubricants o the prior art it was observed that the measured friction coefficients increased rapidly—i.e. after 5 minutes respectively 11 minutes—to unacceptably high values of more that 0.2.

It can be concluded that the durability of the tested liquids of the invention is much better when applied on a conveyor belt made of polyacetal and transporting PET-bottles.

In addition the durability of the liquid composition of Example 2 was tested when applied on a single conveyor belt made of steel material and transporting glass bottles. The same testing method was used as for the tests on the polyacetal conveyor belt transporting PET-bottles.

Furthermore, the same aqueous lubricants of the prior art were used for the comparative tests.

The following results were obtained:

| Friction Coefficient (μ) (on a steel belt transporting glass bottles) | | | | |
|---|---|---|---|---|
| Time (min.) after Applying liquid/lubr. | 0 | 10 | 20 | 30 |
| Example 2 | 0.10 | 0.10 | 0.10 | 0.10 |
| Example A | 0.19 | after about 2 minutes: >0.2 | | |
| Example B | 0.16 | after about 5 minutes: >0.2 | | |

Also in this case, it can be concluded that the durability of the liquid of the invention is much better than that of the aqueous lubricants of the prior art.

EXAMPLE 4

For this example, experiments have been carried out to assess the effect of spillages on the slip value of a conveyor belt system.

In this connection, the slip value of bottles transported by a conveyor belt system is defined as the frictional resistance (in grams, as measured by e.g. a torsion meter coupled to a chart recorder) devided by the weight of said bottles. These bottles may for instance contain milk, beer or other beverages.

The following test method was applied, using a conveyor belt test set-up including a conveyor belt, a motor to drive said belt, a torsion meter coupled to a chart recorder and a device to keep bottles positioned on the belt at the same place.

The chart recorder is turned on and the torsion meter is calibrated with a 500 grams weight and a 700 grams weight. Subsequently, the conveyor belt is run with 8× 500 ml PET bottles, whereby no water or lubricant is applied and consequently the belt is in the dry state. As a result, a base line for the belt running dry was obtained. A frictional resistance value of about 750 grams (i.e. outside the 500–700 gr range) was obtained. After about 5 minutes a water spray was turned on, such that during the entire remaining test period the track was being sprayed with water. This was done because in actual practice parts of the belt, particularly around the fillers—will always be wet. As a result a second base line was obtained on the chart recorder for bottles running with just water, again showing a frictional resistance reading of about 750 grams. After a few minutes, one pipette full (3 ml) of the lubricant liquid composition of Example 3 was applied to the conveyor belt, which brought the chart reading of the frictional resistance down to within the 500–700 grams range. The belt was left running for another 5 minutes. Subsequently, 500 ml of the material to be spilled, was poured over the track, the effect of which with respect to the frictional resistance was registered on the chart recorder.

This procedure of applying the lubricant composition followed by the material to be spilled, was repeated for several types of spillage materials, i.e. soya milk, pepsi cola, orange cordial, summer fruits cordial, and orange juice. In each case, 500 ml of the spillage material was applied.

To work out the slip value, the reading of the chart recorder for the frictional resistance (e.g. 600 gr) was divided by the weight of the bottles positioned on the belt.

In fact, in each case the frictional resistance before spillage was 600 grams for 8×500 ml bottles, resulting in a slip value before spillage of 0.15.

The following slip values were found.

| Type of spillage | slip value just after spillage | Comments |
|---|---|---|
| soya milk | 0.1 | within seconds, the slip value returns to 0.15 |
| pepsi cola | 0.14 | after 6 minutes, the slip slip value returns to 0.15 |
| orange cordial | 0.14 | — |
| Summer fruits cordial | 0.11 | after 4 minutes the slip value returns to 0.15 |
| orange juice | 0.12 | after 4 minutes, the slip value returns to 0.15 |

The above results clearly showing that when applying a liquid composition of the present invention for producing a "dry" lubricant film, spillages donot cause a sharp rise in slip values and even lead to temporary reductions in slip values, are surprising and unexpected. Reason is that when applying aqueous conveyor belt lubricants of the prior art, spillages are well-known to cause an increase in frictional resistance values whereby the transported bottles will consequently fall over on the conveyor belt.

What is claimed is:

1. A method for lubricating a conveyor belt surface sufficient to provide gliding contact with conveyed objects comprising discontinuously applying a liquid lubricant composition comprising (a) an aqueous phase, and (b) 10 to 40% by weight of a silicone oil, said silicone oil being a polydimethyl siloxane, said liquid producing a dry lubricant film remaining on said conveyor belt surface imparting said required lubricity.

2. A method for lubricating a conveyor belt surface sufficient to provide gliding contact with conveyed objects comprising discontinuously applying a liquid lubricant composition comprising (a) 10 to 50% by weight of water, and (b) 10 to 90% by weight of an oil selected from vegetable oils, mineral oils and mixtures thereof, said liquid producing a dry lubricant film remaining on said conveyor belt surface imparting said required lubricity.

3. The method for lubricating a conveyor belt surface according to claims 1 or 2 wherein the liquid composition comprises a polyhydric alcohol.

4. The method to claim 3 wherein said polyhydric alcohol is selected from the group consisting of glycerine, propylene glycol, ethylene glycol and mixtures thereof.

5. The method according to claim 3 wherein said polyhydric alcohol is present in the liquid composition at a concentration of at least 20% by weight.

6. The method for lubricating a conveyor belt surface according to claims 1 or 2 wherein said liquid composition includes an aqueous phase, and wherein polytetrafluoroethylene (PTFE) resin is present in said aqueous phase in the form of an ultrafine particle dispersion of the resin.

7. The method according to claim 6 wherein said PTFE resin constitutes 2 to 25% by weight of the liquid composition.

8. The method for lubricating a conveyor belt surface according to claims 1 or 2 wherein the liquid composition includes a surfactant material selected from the group consisting of anionic surfactants, nonionic surfactants, cationic surfactants, amphoteric surfactants, and mixtures thereof.

9. The method according to claim 8 wherein said surfactant material is present in the composition at a concentration of 0.1 to 10.0% by weight.

10. A method according to claims 1 or 2 wherein the objects are open containers substantially filled with a liquid.

11. A method according to claim 10 wherein said containers are glass or plastic bottles filled with a beverage.

12. A method according to claim 10 wherein said containers are metal containers filled with a beverage.

13. A method according to claims 1 or 2 wherein the objects comprise cardboard containers.

14. The method for lubricating a conveyor belt surface according to claims 1 or 2 wherein said liquid composition is applied onto the surface of a conveyor belt using a flicker non-contact applicator, containing a) a motor-driven, rotating, tubular brush which picks up said liquid composition from a sump via transfer rollers, and b) a steel plate mounted against the brush which flicks the bristles as the brush rotates, to generate a mist of droplets of liquid material directed on to the surface of the conveyor belt.

* * * * *